April 22, 1930. C. W. SKOW 1,755,492
DISK SHARPENER
Filed Jan. 10, 1928
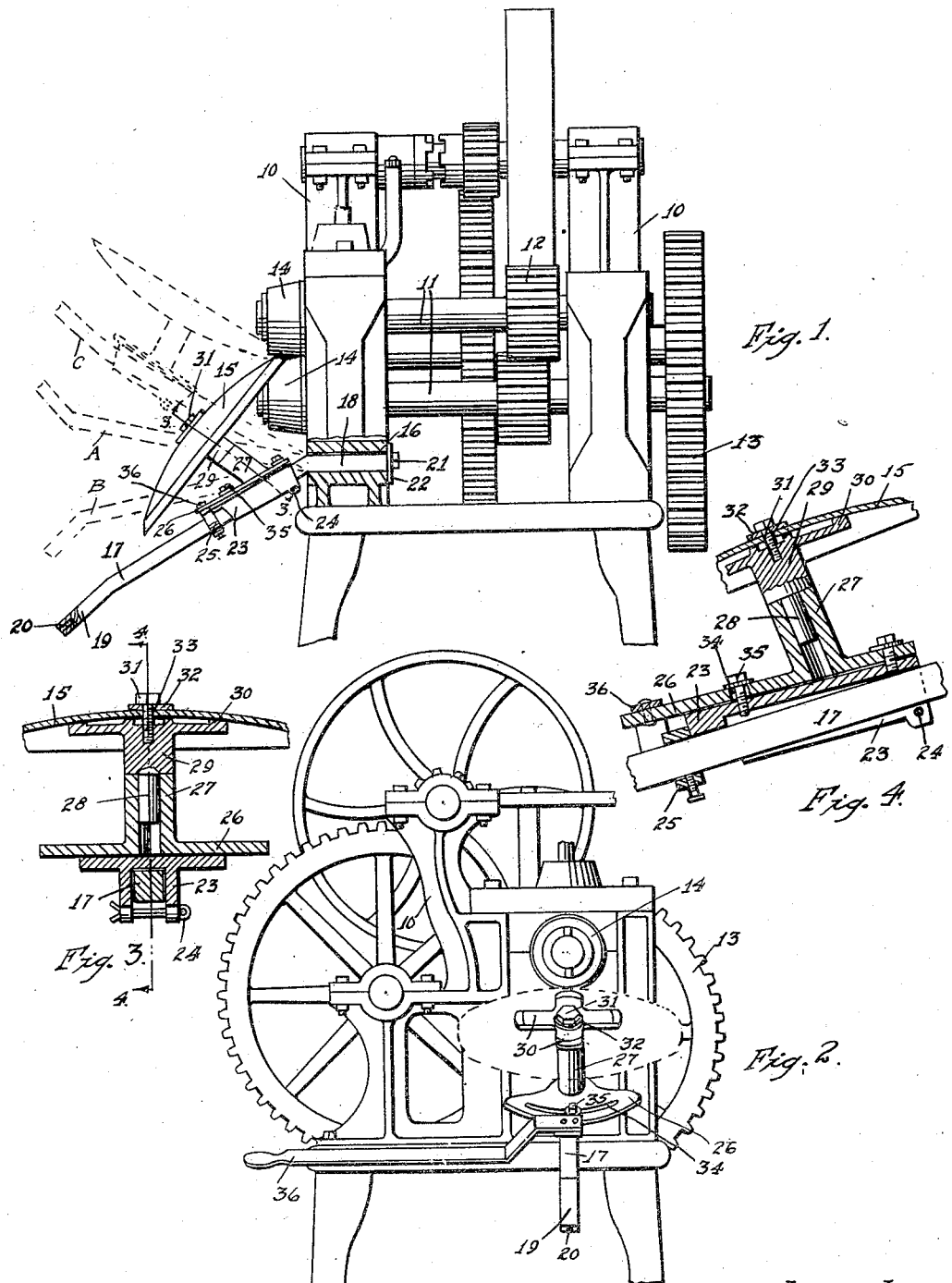
Inventor.
C. W. Skow
by Irving & Hague Atty's.

Patented Apr. 22, 1930

1,755,492

UNITED STATES PATENT OFFICE

CHRISTOPHER W. SKOW, OF NEWTON, IOWA

DISK SHARPENER

Application filed January 10, 1928. Serial No. 245,711.

The object of my invention is to provide an improved disk sharpener of that type employing a pair of shaping rollers adapted to support the disk to be sharpened with its peripheral edge between the rollers, and to have the edge sharpened by being beveled by pressure applied to the shaping rollers.

A further object is to provide in connection therewith improved means whereby various size disks may be easily and quickly placed in operative relation with the shaping rollers, and whereby the disk may be supported at various angles relative to said shaping rollers.

My invention consists in the construction, arrangement and combination of the various parts of the device, whereby the objects contemplated are attained, as hereinafter more fully set forth, pointed out in my claim, and illustrated in the accompanying drawings, in which:

Figure 1 is an end elevation of a disk sharpener showing the manner in which my improved device is applied thereto.

Figure 2 is a side elevation of the same.

Figure 3 is an enlarged detail sectional view taken on the line 3—3 of Figure 1.

Figure 4 is an enlarged, detail, sectional view taken on the line 4—4 of Figure 3.

The numeral 10 indicates the frame of the disk sharpener in which is mounted a pair of parallel shafts 11 having coacting pinion gears 12, for operating the said shafts in opposite directions, power being applied to one of the shafts through a gear 13. The outer end of the shaft 11 is provided with shaping rollers 14, which have their peripheries slightly tapered for receiving the edge of the disk 15 between them.

For supporting the said disk 15 in proper relation with the rollers 14, I have provided in the frame member 10 a socket 16 designed to receive one end of what I shall term a saddle bar 17, said bar being preferably rectangular in cross section, having each end provided with angular portions 18 and 19. The portion 18 is bent at a greater angle relative to the body portion of the bar than the portion 19. Each end of the bar is provided with a screw threaded opening 20 for receiving a cap screw 21 designed to support a washer 22 in position adjacent to the end of the bar, for the purpose of retaining either one of the members 18 or 19 in the socket 16, in the manner clearly illustrated in Figure 1.

Slidably mounted on the body portion of the bar 17 is a saddle 23 retained in position by means of a pin 24 and held against sliding movement in one direction by means of a collar 25, adjustably mounted on the bar 17. Pivotally mounted to the forward edge of the upper surface of the saddle 23 is a saddle plate 26 having an upwardly and outwardly inclined hub 27. Said hub is designed to rotatively receive a pin 28, the upper end of which terminates in a disk supporting head 29 provided with radial arms 30 to engage the central portion of the inner face of the disk to be sharpened. The said disk is secured in position by means of a bolt 31 and a washer 32 in the manner illustrated in Figures 3 and 4. The bolt 31 extends through a central opening 33 which is always provided in cultivator disks. The saddle plate 26 is provided with a slot 34 for receiving a set screw 35 mounted in the top of the saddle 23, and provides means for locking the saddle plate at various angular positions about its pivot center. A handle 36 is provided for operating the plate 26.

By this arrangement it will be seen that the disk 15 may be easily and quickly adjusted at various angles relative to the rollers 14. Disks of various sizes and shapes may be mounted on the head 29. The saddle 23 is adjustably mounted longitudinally of the body of the bar 17 to accommodate disks of various diameters. The body portion of the bar 17 may be mounted at four different angles, as indicated by dotted lines. The position of the bar 17 is shown by solid lines when the member 18 is inserted in the socket 16. The bar 17 takes the dotted line position A when the member 18 has been turned half way over and inserted in the socket 16. The dotted line positions B and C result from placing the member 19 in the socket 16. When the bar 17 is in the C position, the disk 15 may be placed on the arms 30 with the opposite side up from what it is when the bar 17 is in the solid line position.

By this arrangement it will be seen that the bar 17 is of very simple and durable construction, and is adapted to be placed in a number of angular positions to support disks of various sizes and shapes in operative relation with the rollers 14. The saddle 23 is slidably mounted on the bar 17 to further accommodate and support disks of various sizes.

I claim as my invention:

A disk sharpener comprising a supporting frame having a socket, a pair of rollers adapted to bevel the annular edge of a disk to sharpen the same, a saddle bar supported in a common plane with the axis of said rollers and projecting beyond the ends of said rollers, either end of said saddle bar being designed to fit said socket and to be retained against rotation therein, the ends of said saddle bar being bent to form angular portions on the same side of the bar and of different angularity, a saddle slidably mounted on the central portion of said bar, a saddle plate pivotally mounted to said saddle having an upwardly and slightly inclined hub, and means carried by said hub for supporting a disk in operative relation with said rollers, said means comprising a head pivotally mounted in said upright support and provided with radial arms for engaging the under surface of a disk, a bolt for passing through the central opening of a disk and into the end of said head for anchoring the disk thereto.

Des Moines, Iowa, July 6, 1927.

CHRISTOPHER W. SKOW.